United States Patent [19]

Jensen

[11] Patent Number: 5,775,047

[45] Date of Patent: Jul. 7, 1998

[54] METHOD AND APPARATUS FOR PRODUCING LIGHTWEIGHT CONCRETE STRUCTURE

[75] Inventor: Daniel M. Jensen, South Jordan, Utah

[73] Assignee: Davies, Inc., Salt Lake City, Utah

[21] Appl. No.: 641,524

[22] Filed: May 10, 1996

[51] Int. Cl.$^6$ .............................. E04C 1/00; C04B 16/08
[52] U.S. Cl. .............................. 52/596; 52/606; 106/672
[58] Field of Search .............................. 52/596, 603, 604, 52/606; 106/672

[56] References Cited

U.S. PATENT DOCUMENTS

| | | | |
|---|---|---|---|
| 786,884 | 4/1905 | Faulkner | 52/607 X |
| 800,385 | 9/1905 | Miller | 52/503 X |
| 4,069,809 | 1/1978 | Strand | 52/606 X |
| 4,587,279 | 5/1986 | Salyer et al. | 52/596 X |
| 5,024,035 | 6/1991 | Hanson et al. | 52/591.1 |
| 5,457,926 | 10/1995 | Jensen | 52/606 X |

*Primary Examiner*—Wynn E. Wood
*Assistant Examiner*—Kevin D. Wilkens
*Attorney, Agent, or Firm*—Tod R. Nissle, P.C.

[57] ABSTRACT

A cementitious structural member has a high volume of encapsulated captive air and has an unusually high compressive and shear strength.

5 Claims, 2 Drawing Sheets

METHOD AND APPARATUS FOR PRODUCING LIGHTWEIGHT CONCRETE STRUCTURE

This invention relates to cementitious structural members and a method for manufacturing the same.

More particularly, the invention relates to a cementitious structural member which has a high volume of encapsulated captive air but which has an unusually high compressive and shear strength.

The advantages of providing a concrete block (or concrete wall or other concrete structural member) which includes a high proportion of air pores are well known in the art. The air pores increase the insulative properties of the block, reduce the weight of the block, and reduce the quantity of cement and sand required to make the block. However, concrete blocks which have a high proportion of air pores and have a density of less than about sixty to seventy pounds per cubic foot have been impractical because the blocks crumble or structurally are very weak. The weakness of such blocks is believed to be attributable to the fact that when a large number of air bubbles are produced in concrete, the surface tension of the bubbles "controls" the position of the concrete and segregates small portions of concrete in the interstices between adjoining bubbles. When the concrete is so segregated, the concrete in one interstice has little or no contact with the concrete in an adjacent interstice, i.e., an interconnected skeletal concrete structure is not formed, or, if it is formed, it is weak.

One prior art concrete block attempts to solve the foregoing problem by uniformly dispersing alumina powder throughout a concrete--gypsum slurry. The alumina powder participates in a chemical reaction which forms gas bubbles in the slurry. When the gas bubbles form, the concrete-gypsum slurry is relatively viscous and impedes or prevents individual bubbles from coalescing to form large bubbles. The slurry then hardens, trapping the gas bubbles. The gas bubbles in the resulting concrete-gypsum blocks are each of a relatively uniform size. However, even though the concrete-gypsum blocks have a somewhat stronger connective concrete skeleton, the blocks typically in use are relatively heavy and do not produce a building structure having significant compressive and shear strengths. Another disadvantage of the concrete--gypsum blocks is that their manufacture and installation is labor intensive and costly.

Accordingly, it would be highly desirable to provide an improved cementitious block which would include a high proportion of air pores and provide a high insulation or "R-factor", which would be comparatively inexpensive in manufacture, which would have a density in the range of five pounds per cubic foot to about fifty pounds per cubic foot, and which would, after being removed from a mold, facilitate curing of the block by distributing water over a large surface area inside the block. It would also be desirable to provide a method for manufacturing the improved block.

Therefore, it is a principal object of the invention to provide an improved cementitious block and method for making the same.

A further object of the invention is to provide an improved cementitious block which contains a high proportion of air pores but still can be employed in a wall structure system having compressive strength which greatly exceeds that of a conventional wood frame construction.

Another object of the invention is to provide a lightweight, strong cement block which can be produced quickly and at low cost.

These and other, further and more specific objects and advantages of the invention will be apparent to those skilled in the art from the following detailed description thereof, taken in conjunction with the drawings in which.

Figure 1:
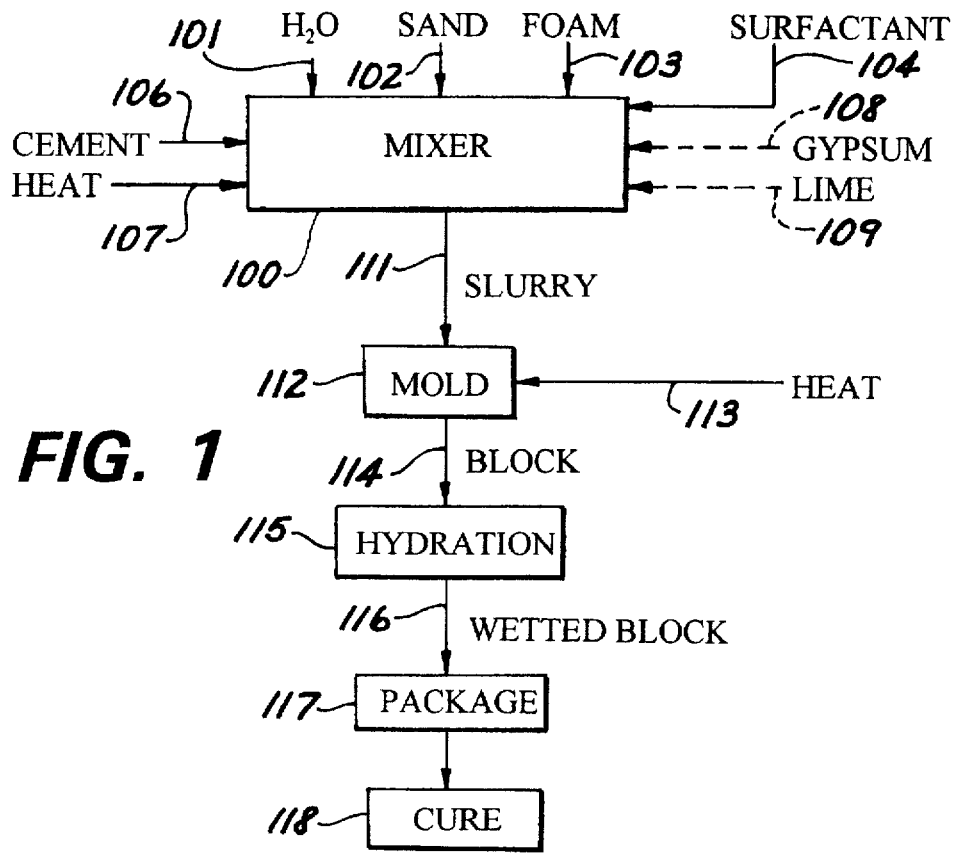
FIG. 1 is a block flow diagram illustrating the process utilized to make the improved lightweight cementitious block of the invention.

Briefly, in accordance with my invention, I provide an improved viscous moldable cementitious slurry for forming a cementitious structural member. The slurry includes water; a cementitious binder; and, a plurality of bubbles. Substantially all of the bubbles each have a width in the range of about $1/128$ to $1/4$ of an inch. The slurry has a viscosity sufficient generally to prevent the coalescing of the bubbles to form larger bubbles.

In a further embodiment of the invention, I provide an improved viscous moldable cementitious slurry for forming a cementitious structural member. The slurry includes water; a cementitious binder; a plurality of small air bubbles, the slurry having a viscosity sufficient generally to prevent the coalescing of the bubbles to form larger bubbles; and, a chemical composition or energy source for reducing surface tension to facilitate the coalescing of the bubbles to form larger bubbles when the viscosity of the slurry is reduced to a selected level.

In another embodiment of the invention, I provide an improved rigid lightweight cementitious structural member. The member includes a rigid cementitious structure; and, a network of different sized pores some of which are interconnected and each having a width in the range of about $1/128$ to $1/4$ of an inch. The structural member has a density in the range of five pounds per cubic foot to fifty pounds per cubic foot and can include a smooth outer surface having small pores with a width no greater than $1/32$ of an inch.

In still a further embodiment of the invention, I provide an improved rigid lightweight cementitious structural member. The structural member comprises a rigid cementitious structure; a network of pores in the structure, at least some of said pores being interconnected and each having a width in the range of about $1/128$ to $1/4$ inch and shaped and dimensioned to draw water into the structure by capillary action; and, water in the pores.

In yet another embodiment of the invention, I provide a improved process for producing a lightweight cementitious structural member. The process includes the steps of mixing together a cementitious binder and water and supplying air to form a slurry entrained with small air bubbles and having a viscosity which prevents the movement of the bubbles through said slurry; pouring the slurry into a mold to set up and form a lightweight rigid structural member, and, before the slurry hardens, decreasing the viscosity of the slurry to permit the bubbles to coalesce to form increased size air bubbles, and increasing the viscosity of the slurry to capture the increased size air bubbles and generally prevent coalescing of the increased size air bubbles.

In yet still a further embodiment of the invention, I provide an improved process for producing a lightweight cementitious structural member. The process includes the steps of mixing together a cementitious binder and water and supplying air to form a slurry entrained with small air bubbles; pouring the slurry into a mold to set up and form a lightweight rigid structural member, and, before the slurry hardens, permitting the bubbles to coalesce to form increased size air bubbles, and increasing the viscosity of the slurry to capture the increased size air bubbles and generally prevent coalescing of the increased size air bubbles.

In a further embodiment of the invention, I provide an improved process for producing a lightweight cementitious structural member. The process includes the steps of mixing together a cementitious binder and water and supplying air to form a slurry entrained with small air bubbles; heating a mold to a temperature sufficient to break air bubbles in said slurry adjacent mold to form a smooth slurry surface adjacent the mold; and, pouring the slurry into the heated mold.

In another embodiment of the invention, I provide an improved process for producing a lightweight cementitious structural member. The process includes the steps of mixing together a cementitious binder and water and supplying air to form a slurry entrained with small air bubbles; pouring the slurry into said heated mold; and, decreasing the surface tension of the bubbles to facilitate the coalescing of the bubbles to form increased size air bubbles.

In still a further embodiment of the invention, I provide an improved process for producing a lightweight cementitious structural member. The process includes the steps of mixing together a cementitious binder and water and supplying air to form a slurry entrained with small air bubbles; fusing the slurry to decrease the viscosity of said slurry and to coalesce the air bubbles to form increased size air bubbles; increasing the viscosity of the slurry to capture the increased size air bubbles; permitting the slurry to set to form a lightweight porous structure including a network of pores which draw liquid into said structure by capillary action; and, applying water to the structure such that the network of pores draws water into the structure by capillary action.

Turning now to the drawings, which describe the invention for the purpose of explaining the use thereof and not by way of limitation of the scope of the invention, and in which like characters refer to corresponding elements throughout the several views, FIG. 1 is a block diagram illustrating the process for manufacturing a cementitious block or other cementitious structural member in accordance with the principles of the invention. In FIG. 1, cement 106 and water 101 are combined in mixer 100 for a short period, presently typically about three to five seconds, after which sand 102, foam 103, and surfactant 104 are added and the resulting mixture is agitated for about thirty seconds. The foam 103 supplies air for the slurry. Foam 103 is produced by blowing or mixing air into a foaming agent. The bubbles in foam 103 presently preferably are quite small and the foam has an appearance similar to that of shaving cream. The foam bubbles typically have a width of less than about one sixty-fourth of inch. The bubbles presently are of uniform size, but can be of differing size. If desired, gypsum 108 can be added to mixer 100 with cement 106 to accelerate the setup of blocks produced using the slurry 111. Lime 109 can be added to increase the viscosity of the resulting slurry 111. Surfactants can, if desired, be mixed in foam 103 prior to adding foam 103 to mixer 100.

Water 101 is presently preferably heated to a temperature in the range of eighty to one hundred eighty degrees F. The foam 103 is presently preferably heated to a temperature in the range of eighty to one hundred eighty degrees F. The mold 112 and/or mixer 100 presently preferably are heated to a temperature in the range of eighty to about one hundred eighty degrees F. Additional heat can be added to mixer 100 by blowing heated air into the mixer or by any other desired means. As would be appreciated by those of skill in the art, the sand, foaming agent, surfactants, gypsum, lime, and/or heat 107 can, if desired, be omitted from the process illustrated in FIG. 1. If desired, the water, sand, and other components admixed in mixer 100 need not be heated.

While the proportion of cement to sand by weight can be in the range of 10:1 to 10:30, the ratio of cement to sand by weight typically is about 1:1.

After the water 101, sand 102, foam 103, surfactant 104, cement 106, and heat 107 have been admixed in mixer 100 for thirty seconds, the resulting heated slurry 100 is poured into a mold 112. The resulting slurry 100 is presently preferably fairly stiff, i.e., has a viscosity greater than the primary critical viscosity. As used herein, the primary critical viscosity is the viscosity of a cementitious slurry at ambient pressure at sea level (the slurry having a selected temperature and a selected composition and components) above which air bubbles in slurry 100 can not move through the slurry and coalesce to form in a desired time period larger bubbles substantially all of which are in a selected width range. When the bubbles can not move through the slurry, coalescing of bubbles is impeded. When bubbles coalesce, they join and unite. A pair of bubbles can touch without coalescing. For example, when a pair of spherical bubbles touch and each retain their original spherical shape, they have not coalesced. If a pair of bubbles bump and cause each other to change shape without breaching the outer wall of either bubble, they have not coalesced. If a pair of bubbles bump into each other and a portion of the spherical wall of each bubble collapses and the bubbles join in a figure eight type configuration (with the original spherical wall of each bubble intact except at the circular line along which the spherical walls meet and join), then the bubbles have coalesced. When a pair of rubber balls are pressed gently against one another, they take on a figure eight type configuration. As used herein, the secondary critical viscosity is the viscosity of a cementitious slurry at ambient pressure at sea level (the slurry having a selected temperature and a selected composition and components) above which air bubbles can not move through the slurry. The secondary critical viscosity is greater than the primary critical viscosity, i.e., a slurry with the secondary critical viscosity is stiffer than a slurry with the primary critical viscosity. Heat 113 is preferably, but not necessarily, applied to mold 112 to heat the mold to a temperature of from eighty degrees F to two hundred and ten degrees F. When mold 112 is heated, the heat in the mold breaks bubbles which are in the slurry adjacent the inner surfaces of the mold. This produces a relatively smooth, dense, continuous outer block surface which is adjacent the inner surfaces of the mold 112 and has small pores that presently are typically one thirty-second of an inch wide, or smaller. Heat from mold 112 hastens hardening of the slurry. Molds for producing blocks and other cementitious structures are well known in the art and will not be described herein.

Chemical reactions taking place in mold 112 due to the presence of the cement 106 or other chemicals such as calcium chloride can produce heat. This heat, in combination with the heat provided by the heated mold 112, fuses slurry 111 soon after it is poured into mold 112, temporarily reducing the viscosity of slurry 111 to a point below the primary critical viscosity so that air bubbles in the slurry 111 can move, coalesce and form larger bubbles. The air bubbles in the slurry have a critical surface tension. The heat also functions in conjunction with surfactants to weaken surface tension and facilitate coalescing of bubbles. In the presently preferred embodiment of the invention, the bubbles in the foam 103 will not readily collapse and/or coalesce unless the slurry is heated to a temperature above 80 degrees, preferably to a temperature in the range of ninety degrees to one hundred and eighty degrees. It is anticipated, however, that bubbles in foam 103 could be collapsed without using heat and by using a appropriately strong surfactant, vibrations, ultrasound, and/or any other desired means.

As used herein, the surface tension of a bubble in a cementitious slurry at ambient pressure at sea level (the slurry having a selected temperature, a selected composition and components, and having a certain viscosity below the primary critical viscosity) is the ability of the bubble to resist coalescing in the presence of a particular surfactant(s) or other chemical and/or in the presence of other means for causing a bubble to collapse or coalesce. As is well known, there are foaming agents which produce bubbles which are more resistant to collapse and coalescing either in the presence of a certain surfactants or when heat, vibration, ultrasound, or other means are applied to the cementitious slurry to cause bubble to collapse or coalesce with another bubble to form a new larger bubble. One foaming agent can produce bubbles more resistant to a particular surfactant than another foaming agent. After a foaming agent is selected, or after the means for introducing bubbles in a cementitious slurry is selected, then various surfactants or other bubble collapsing and coalescing means can be readily tested to determine if the desired width range of bubbles is obtained during the desired time period when the viscosity of the cementitious slurry is below the primary critical viscosity. As used herein, the critical surface tension of a bubble is the surface tension below which the bubble will coalesce with other bubbles in a cementitious slurry at ambient pressure at sea level (said slurry having a certain temperature, a selected composition and components, and having a certain viscosity below the primary critical viscosity) to produce increased size bubbles in a desired width range during a selected period (length) of time when the viscosity of the cementitious slurry is below the primary critical viscosity.

When slurry 111 fuses and its viscosity is reduced below the primary critical viscosity, slurry 111 is also in the process of setting up and hardening. Accordingly, after temporarily decreasing, the viscosity of the slurry begins to increase and soon once again exceeds the primary critical viscosity. The viscosity of the slurry continues to increase until the slurry sets and forms a substantially rigid block. In the presently preferred embodiment of the invention, the viscosity of the slurry is below the primary critical viscosity for only about thirty to forty-five seconds. About four minutes after the slurry is poured into the mold, it has hardened and formed a "green" block which is sufficiently rigid to be removed from the mold.

The "green" block is pushed upwardly out of the mold by a platform which comprises part of the bottom of the mold. Once this platform clears the top of the sides of the mold, the green block 114 is removed from the platform onto a conveyor or other block transport mechanism. As the block 114 is transported away from the mold, it is further hydrated 115 by spraying the block with water or by dipping the block in a water bath. The pore network in the block 114 absorbs supplemental water into the block by capillary action. This supplemental water facilitates the slow curing of the block and provides adequate water to complete the hydration process. Water in the original block slurry tends to evaporate into air in the pores and into the ambient air, cannibalizing water from the cement and possibly preventing the cement from completely hydrating. The absorption into the block by capillary action of supplemental water helps to offset the loss of water by evaporation into air in block pores.

The hydrated block 116 is stacked on a pallet, shrink wrapped or packaged 117 with other hydrated blocks on the pallet, and is set out in the sun to cure 118. The blocks 116 can also be placed in an oven, autoclave, or other desired location (heated or not) to be cured. The autoclave includes water vapor in the air. Heat and water can be utilized to increase the speed at which concrete cures.

Figure 2:
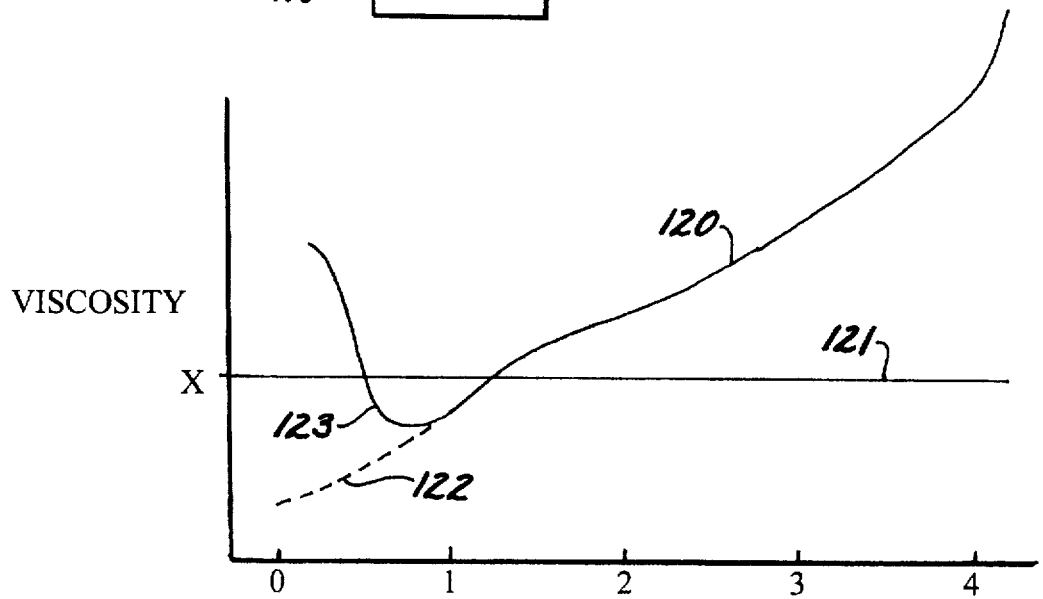
FIG. 2 is a graph illustrating the critical viscosity utilized in the practice of the method of the invention.

The graph of FIG. 2 illustrates the relationship between the viscosity of the slurry 111 and the length of time the slurry is in the mold. The primary critical viscosity X is indicated in the graph of FIG. 2 by horizontal line 121. After slurry 111 is placed in mold 112 at time zero, the slurry 111 rapidly fuses due to the heat from the mold and due to the heat contained or being generated in slurry 111 by the components of the slurry 111. When slurry 111 fuses, the viscosity of the slurry 111 drops 123 below the primary critical viscosity X for approximately thirty to forty-five seconds. While the viscosity of slurry 111 is below the primary critical viscosity, air bubbles in the slurry 111 coalesce to form bubbles substantially all of which have a width in the range of 1/128 of an inch to about one-half of an inch, preferably 1/64 to one-quarter of an inch. Once the viscosity of slurry 111 is no longer below line 121, the bubbles in the slurry 111 can no longer coalesce. The viscosity of slurry 111 can not be below line 121 for too long, otherwise unacceptably large bubbles form in the slurry 111.

While it is presently preferred that slurry 111 be fairly stiff when poured into mold 112, it is possible that a rapidly setting slurry can be used which, when poured in mold 112, has a viscosity 122 which is less than the critical viscosity but is increasing in the manner shown in FIG. 2. In such a case, it is sometimes advisable to utilize a foaming agent which is more resistant to surfactants or other surface tension reduction means so that the bubbles in slurry 111 are more resistant to breakage and not all of the bubbles escape from the slurry 111 before the viscosity of slurry 111 reaches the critical viscosity 121. One possible problem with this approach is that the heavier particles in the slurry tend to sink under gravity toward the bottom of the mold, producing a block which is stronger at the bottom than at the top. When the slurry 111 poured into a mold is stiff and prevents the migration of bubbles, it also tends to prevent sand and other components from being pulled toward the bottom of the mold under gravity. Similarly, if the slurry 111 produced by mixer 100 is fairly stiff and prevents the migration of bubbles, but begins to fuse prior to being poured into mold 112, then gravity can pull slurry components toward the bottom of the mold, again resulting in a block having a bottom which is heavier and stronger than the top of the block.

As would be appreciated by those skilled in the art, the time that the viscosity of the slurry 111 is less than the primary critical viscosity can be adjusted as desired, as can the time required for a block to set after slurry 111 is poured in a mold. If, for example, it is desired to take eight minutes (or an hour, a day, etc.) instead of four minutes for the block to set, then the amount of heat added to slurry 111, mixer 100 or mold 112 or block 114 can be decreased to slow the formation of bubbles or to slow the setting and hardening of the slurry 111. The quantities of air, water, cement, foaming agent, surfactant, heat, etc. and other components in slurry 111 can, as would be appreciated by those of skill in the art, be varied to control or alter the time it takes a block to set or to control or alter the proportion of air or bubbles in a cementitious block or other structural member which is manufactured in accordance with the principles of the invention.

When bubbles in slurry 111 collapse and coalesce during the time the viscosity 123 is below the critical viscosity, substantially all of the resulting larger bubbles have sizes in the range of 1/128 of an inch up to about one half of an inch, preferably 1/64 of an inch up to one-quarter of an inch. The resulting larger bubbles includes many different bubble sizes, much like concrete aggregate often includes many different sizes of stones. As used herein with respect to bubbles or pores in a cementitious structural member, the term "substantially all" designates at least 75% of the total bubble or pore volume in a block or other cementitious structural member or in the slurry in a mold. The larger bubbles formed in the slurry are often asymmetrical. Presently, it appears that the larger the bubble, the more likely it will be asymmetrical. The network of different sized asymmetrical and symmetrical or nearly symmetrical bubbles which forms in the cementitious material permits the cement in the slurry to form an interconnected rigid network extending between and adjacent bubbles and through the block and which has, when the density of the block is about twenty-five pounds per cubic foot, a compressive strength of about 250 psi. The density of the block of the invention is typically in the range of about five pounds per cubic foot to seventy-five pounds per cubic foot, preferably ten pounds per cubic foot to fifty pounds per cubic foot. As would be appreciated by those of skill in the art, the compressive strength of the block can be varied by varying the amount of cement or sand, the volume of water, the volume of air, etc. in the block.

The proportions of binder, sand, water, etc. which are intermixed to form a slurry in accordance with the invention can vary as desired. Presently, however, in general, the weight percentage of cementitious binder (concrete or other cementitious material) is in the range of 10% to 75%, of filler (sand or other granular mineral materials) is in the range of zero to 55%, of gypsum or another "accelerator" which reduces setup time is from zero to 10%, of lime or another component which increases the viscosity of the slurry is from zero to 15%, of an anionic surfactant (which reduces the amount of water which must be mixed with cement) is 0% to 10%, of a non-ionic surfactant is from 0% to 10%, of a foaming agent (which may include water) is 0% to 50%, of a hydrotrope (usually used with a non-ionic surfactant) is from 0% to 20%, of water is from 5% to 50%, and of fibers is from 0% to 20%. The fibers are added to strengthen and reduce the brittleness of the resulting block or other cementitious structural member. The fibers can comprise polypropylene strands, carbon fibers, or fiber comprised of any other desired material. Other strengthening materials can be added. The presently preferred foaming agent is a hydrolyzed protein or blood. Any desired foaming agent can be utilized. An example of an anionic surfactant is melamine formaldehyde polycondensate (hereafter called "melamine"). Melamine functions to decrease the amount of water needed to produce a cementitious slurry. When the amount of water is decreased, the slurry sets up faster. Sodium 2 ethylhexylsulfate (NIAPRUF 08 surfactant) manufactured by Niacet Corporation of Niagara Falls, N.Y. is a anionic surfactant which can be utilized. TRITON X100, a non-ionic surfactant manufactured by Union Carbide, can also be utilized. Anionic and non-ionic surfactants reduce surface tension and facilitate the coalescing of air bubbles into larger size bubbles.

A hydrotrope, for example a phosphate ester, can be utilized to keep a non-ionic surfactant in solution in alkaline conditions. Many anionic and non-ionic surfactants are known in the art Sodium benzoate, salt, or any desired preservative can be utilized to extend the life of organic foaming agents by preventing the oxidation of such agents.

By way of example, and not limitation, in one particular embodiment of the invention, a cementitious composition is added to and admixed in mixer 100 for up to ten seconds (or more if desired), after which a foam composition is added and mixed with the cementitious composition for about thirty more seconds before the resulting slurry is poured into one or more molds. The cementitious composition includes cement (15 to 80% by weight), sand (0.1 to 68% by weight), gypsum (0.1 to 5.0% by weight), lime (0.1 to 16% by weight), an anionic surfactant (0.1 to 2.0% by weight), fibers (0.1 to 15% by weight), and water (15 to 50% by weight). The foam composition includes cow's blood (0.5 to 10% by weight), a non-ionic surfactant (0.1 to 2% by weight), an anionic surfactant (0.1 to 2.0% by weight), a phosphate ester (0.1 to 2.0% by weight), sodium benzoate (0.1 to 2.0% by weight), and water (85 to 99% by weight).

By way of further example, and not by way of limitation, in another particular embodiment of the invention, a foaming agent mixture is produced by mixing together one-half gallon of hydrolyzed blood powder, five gallons of water heated to ninety degrees F, ninety grams of non-ionic Triton X100 surfactant (Union Carbide), ninety grams of phosphate ester, and twenty grams of caustic soda (to put the pH of the mixture in the range of 7 to 12 so the blood will foam). Air is blown into the foaming agent mixture to produce a foam composition having many small (less than 1/32 of an inch wide) symmetrical bubbles. The foaming agent is heated to ninety degrees F. A slurry is prepared by mixing together for about five to ten seconds one hundred pounds of cement, one hundred pounds of sand, thirty ounces of Melment anionic surfactant (containing melamine) manufactured by W. R. Grace & Co., forty grams of polypropylene fiber, and twelve and a half gallons of water heated to ninety degrees F. The entire foam composition is mixed together with the slurry for about thirty seconds and is poured into ten block molds heated to one hundred and twenty degrees F. The molds are presently preferably, but not necessarily, heated to a temperature of from eight degrees F to one-hundred and eighty degrees F. After about four minutes, the slurry has set up and formed green blocks 10 which are removed from the molds, sprayed with water, and cured.

An organic foaming agent like blood or hydrolyzed protein preferably has a pH of from 7 to 14 because it helps the agent form foam when intermixed or contacted with air.

The pores in the cured block are often asymmetric, although some of the pores are symmetrical or nearly symmetrical. Although the width of substantially all of the pores varies widely from 1/128 of an inch to about 1/2 of an inch (preferably 1/64 to 1/4 of an inch), the volume of pores tends to be uniformly distributed throughout the block, i.e., each cubic inch of the block has about the same total volume of pore space, except near the outer surface of the block, which has a much lower volume of pore space because of the destruction of air bubbles by the heated mold surface. Although many of the pores in the blocks presently produced in accordance with the invention are interconnected, in another embodiment of the invention it is desirable to produce blocks in which a large majority of the pores are not interconnected. When the pores are not interconnected, the rate of evaporation of water from the block is reduced.

As noted, a surfactant and heat are presently preferably utilized to reduce the surface tension of air bubbles in the slurry to facilitate the coalescing of the bubbles to form larger bubbles. Ultrasound, vibration, a surfactant(s) only, heat only, and any other desired means can be utilized in combination with or in place of the surfactant and heat to reduce surface tension or collapse bubbles to facilitate the formation of larger bubbles.

As used herein, the width of a bubble is determined by calculating the diameter of a sphere having the volume of the bubble. The diameter of the sphere is the width of the bubble. Most bubbles in the finished cementitious structural members produced in accordance with the invention have a generally globular or elliptical shape.

As earlier noted, air is presently preferably supplied in the slurry by mixing foam in the slurry. If desired, air can be supplied in the slurry by blowing air directly into the slurry to form bubbles; by mixing or beating the slurry to "fold" air into the slurry; by an in situ chemical reaction or another gas; or, by any other desired process. As utilized herein, the term air embodies any gas in the slurry which forms bubbles in the slurry.

Blocks produced in accordance with the invention can have any shape and dimension, but the blocks presently preferably have hollows extending through the blocks such that when the blocks are stacked in rows one on top of the other, vertically oriented rebar can be extended through the hollows to footers and the hollows filled with concrete to form a vertically oriented concrete pillar extending through the hollows. The rebar and concrete pillar improve the compressive and shear strength of the stacked blocks. Further, the blocks preferably have a tongue and groove type configuration such that at least one tongue at one end of a block can be fit and seated in a groove in the end of an adjoining block. Further still, the blocks preferably have a tongue and groove type configuration on the top and bottom of the blocks such that tongues on the top of a first block can be fit and seated in grooves on the bottom of a second block stacked on the first block. Such a tongue and groove block configuration significantly strengthens a structure made with the blocks.

Figure 3:
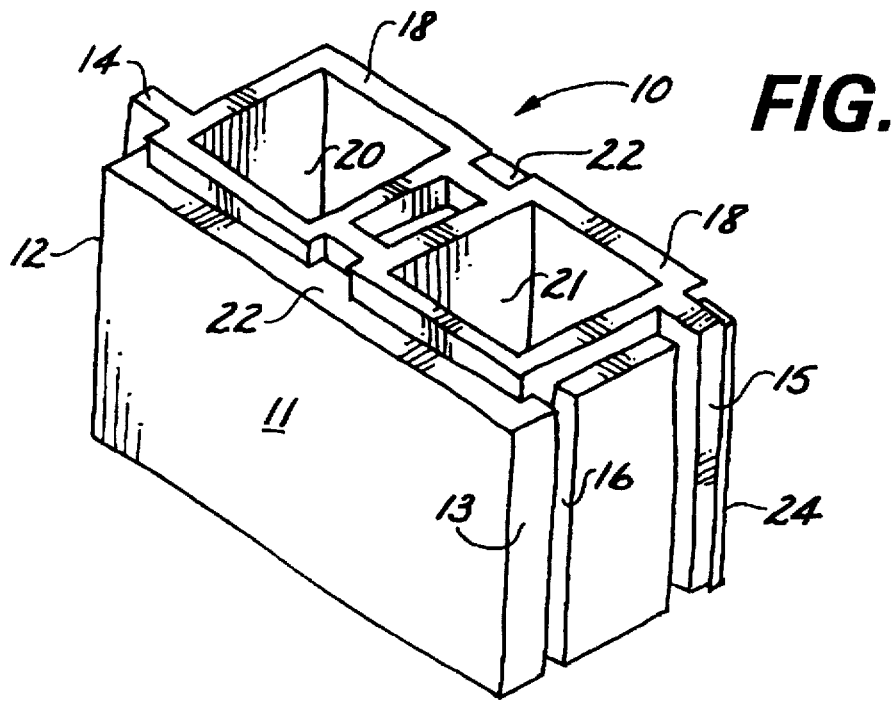
FIG. 3 is a top perspective view of a block molded in accordance with the method of the invention; and, FIG. 4 is a bottom perspective view of the block of FIG. 3.
Figure 4:
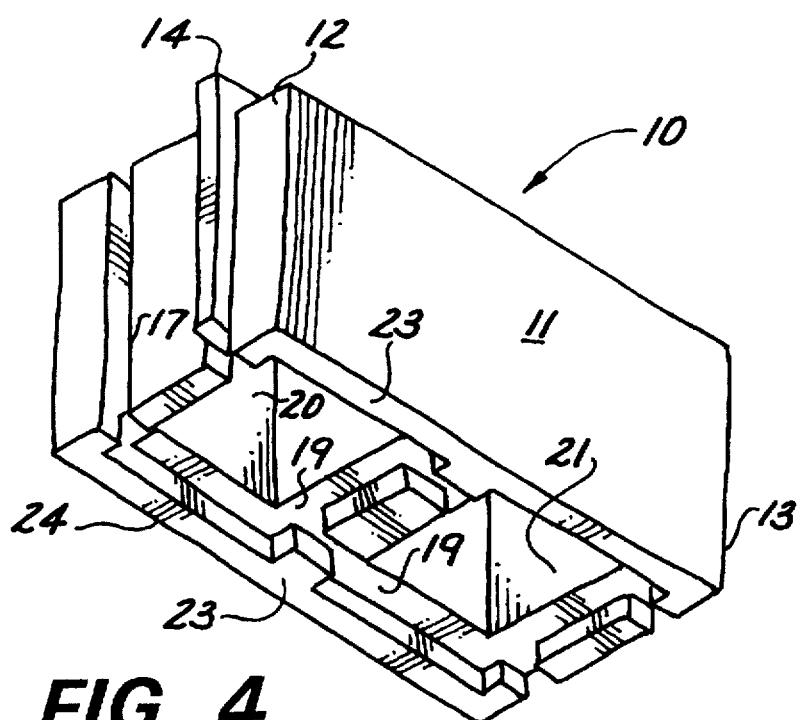

One tongue and groove block design is illustrated in FIGS. 3 and 4 where block 10 includes tongue 14 and groove 17 which conform to and interfit with the groove 16 and tongue 15 on the end of a second identical block placed end-toend with block 10. Similarly, block 10 includes a lip 18 which is generally in the shape of the number eight, which upstands from top 22, and which interfits with the recess 19 formed in the bottom 23 of a second indentical block placed on top of block 10. Block 10 includes parallel opposed sides 11, 24; parallel opposed ends 12, 13; and, openings or hollows 20 and 21 extending through block 10 from top to bottom. Each hollow 20 and 21 has a rectangular cross sectional area.

Having described my invention in such terms as to enable those skilled in the art to understand and practice it, and have described the presently preferred embodiments thereof, I claim:

1. A rigid lightweight cementitious structural member comprising
   (a) a rigid cementitious structure; and,
   (b) a network of asymmetrical and symmetrical pores in said structure some of which are interconnected, substantially all of said pores being of many different widths ranging from $1/128$ to $1/4$ of an inch;
   said structural member having a density in the range of five pounds per cubic foot to fifty pounds per cubic foot.

2. The cementitious structural member of claim 1 including a smooth surface with small pores each having a width no greater than about $1/32$ of an inch.

3. The cementitious structural member of claim 1 wherein substantially all of said pores are of many different widths ranging from $1/128$ to $1/2$ of an inch.

4. The cementitious structural member of claim 1 wherein said pores are shaped and dimensioned to draw water into the structure by capillary action.

5. The cementitious structural member of claim 4 including water in said pores, said water drawn into said pores by capillary action.

* * * * *